3,016,364
POLYURETHANE PLASTICS
Erwin Müller, Leverkusen, Germany, assignor, by direct and mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware
No Drawing. Filed Aug. 1, 1957, Ser. No. 675,533
Claims priority, application Germany Nov. 16, 1956
3 Claims. (Cl. 260—47)

This invention relates generally to the manufacture of polyurethane plastics and, more particularly, to a novel and improved method for making homogeneous polyurethane plastics and to the improved product resulting therefrom.

It has been proposed heretofore to manufacture high molecular weight cross-linked plastics by reacting a linear o substantially linear condensation or polymerization product containing at least two reactive hydrogen atoms and having a molecular weight of at least about 1,000 with an organic polyisocyanate and a cross-linker or chain extender which may be a compound having a molecular weight of less than 1,000 having at least two hydrogen atoms which will react with an organic isocyanate. The condensation or polymerization product used in such reactions is an organic compound having at least two reactive hydrogen atoms and may be a polyester, a polyester amide, polyalkylene ether glycol, a polythioether glycol, a polyacetal or the like having a molecular weight of at east 1,000. The cross-linking agent or compound may be any suitable compound having reactive hydrogen atoms, such as, for example, water, di- or trivalent alcohols, amino alcohols or diamines, and a molecular weight of less than 1,000.

One of the more suitable processes for making homogeneous polyurethane plastics is disclosed in U.S. Patent 2,729,618, granted to Müller et al. January 3, 1956. In accordance with the process disclosed in the patent, the polyurethane plastic is prepared by reacting a polyester with an excess of an organic polyisocyanate and reacting the resulting product with a glycol. The glycol may be either an aliphatic compound or a cyclic glycol, such as quinitol or hexahydropyrocatechol. By varying the amount of polyester, polyisocyanate or cross-linking agent used, the physical characteristics of the resulting polyurethane plastic may be varied from elastomeric or rubber-like to leather-like. The physical characteristics of the plastic are not only determined by the proper choice of a cross-linking agent but also by the proper selection of organic polyisocyanate and organic compound having reactive hydrogen atoms. It has been found that when an aliphatic glycol, such as ethylene glycol, is used as the cross-linking agent, polyurethane plastics having the more desirable physical characteristics are obtained only when 1,5-naphthylene diisocyanate or para-phenylene diisocyanate is used. In other words, it has been necessary heretofore to use 1,5-naphthylene diisocyanate in most formulations. This particular diisocyanate has the disadvantages of being relatively expensive and difficult to make. Moreover, the product obtained by reacting 1,5-naphthylene diisocyanate with the organic compound having at least two reactive hydrogen atoms cannot be stored for any appreciable time before it is cast into the desired configuration because it becomes too viscous and cannot be poured into the casting mold.

It is possible to substitute organic polyisocyanates of less chemical reactivity than that of 1,5-naphthylene diisocyanate if a glycol containing at least two condensed aromatic rings is used as the cross-linker. The organic polyisocyanates having this reduced chemical reactivity include 4,4'-diphenylmethane diisocyanate, 2,4-toluylene diisocyanate and the like. Processes which involve the use of glycols having at least two condensed aromatic rings have the disadvantage, however, of being difficult to control because such glycols have a high melting point and relatively low solubility and the processes are not especially adaptable for preparing cast polyurethane products. It is very difficult to produce homogeneous melts by such processes and operation at relatively high temperatures is required with the result that the time interval between preparation of the plastic mass and final casting is relatively short, making it impossible to devise an uncomplicated casting procedure.

It is therefore an object of this invention to provide an improved process for making elastomeric polyurethane plastics devoid of the foregoing disadvantages. Another object of the invention is to provide a method for making polyurethane plastics from organic compounds having at least two reactive hydrogen atoms and a molecular weight of at least 1,000, organic polyisocyanates and an improved cross-linking agent which permits use of those organic polyisocyanates which have a chemical reactivity with reactive hydrogen atoms less than that of 1,5-naphthylene diisocyanate. Still another object of the invention is to provide a method for making elastomeric polyurethane plastics from the organic polyisocyanates having a chemical reactivity less than that of 1,5-naphthylene diisocyanate having improved physical characteristics. A further object of the invention is to provide a method for making a storage-stable isocyanate-modified organic compound having at least two reactive hydrogen atoms. Still a further object of the invention is to provide a novel polyurethane plastic.

Generally speaking, the foregoing objects as well as others are accomplished in accordance with this invention by providing a method for preparing homogeneous or non-porous polyurethane plastics from an organic polyisocyanate, an organic compound having at least two reactive hydrogen atoms and a molecular weight of at least 1,000 and a phenylene-di(β-oxyethylether). It has been found that cross-linked non-porous polyurethane plastics having suitable elastomeric or leather-like characteristics may be prepared even from those organic polyisocyanates having a chemical reactivity of less than that of 1,5-naphthylene diisocyanate provided that a phenylene-di(β-oxyethylether) is used as the cross-linking agent instead of one of the heretofore available glycols, diamines, water or other cross-linking agents. The organic compound having at least two reactive hydrogen atoms and a molecular weight of at least 1,000 must have an hydroxyl number of from about 20 to about 80 in order to produce a plastic having the desirable rubber-like characteristics. It is preferred to use a molar excess of organic polyisocyanate over that required to react with all of the reactive hydrogen atoms of the organic compound having at least two reactive hydrogen atoms. The preferred ratio of organic polyisocyanate to organic compound having reactive hydrogen atoms is from about 2.5 to about 4 mols organic polyisocyanate per mol of organic compound having at least two reactive hydrogen atoms although from about 2 mols to about 6 mols organic polyisocyanate per mol of organic compound having at least two reactive hydrogen atoms may be utilized.

The product obtained in accordance with this invention has a structure containing the following grouping:

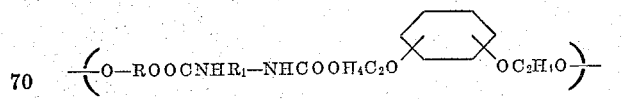

wherein $R_1$ is a divalent radical derived from an aromatic polyisocyanate and R is the residue of a substantially linear organic compound having at least two reactive hydrogen atoms and a molecular weight of at least 1,000.

Substitution of a phenylene-di(β-oxyethylether) for one of the heretofore available linear aliphatic or cyclic glycols provides a unique process inasmuch as it permits the use of the lesser reactive organic polyisocyanate, such as, for example, 4,4'-diphenylmethane diisocyanate instead of 1,5-naphthylene diisocyanate without any substantial sacrifice in physical characteristics in the product. The melting point of the phenylene-di(β-oxyethylethers) is about 100° C. and each of these ethers is soluble in the reaction mixture normally used for making polyurethane plastics permitting processing of the plastic mass at low temperatures. The novel cross-linker provided by this invention has the further advantage of being more soluble in the prepolymer formed by the reaction of the organic compound having at least two reactive hydrogen atoms with the organic polyisocyanate than the heretofore available cross-linkers. The time interval between mixing the cross-linker with the prepolymer and hardening of the mixture to the point where it can no longer be poured or molded is considerably longer than the time interval when 1,5-naphthylene diisocyanate and one of the linear aliphatic or cyclic glycols is used, thus providing a process adaptable to continuous production and more suitable for combining with other processing steps.

Any suitable phenylene-di(β-oxyethylether) may be utilized as the cross-linking agent or chain extender in accordance with this invention, but it is preferred to use paraphenylene-di(β-oxyethylether). Other suitable phenylene-di(β-oxyethylethers) include the isomers and alkyl-substituted products, such as, for example, meta-phenylene-di(β-oxyethylether), ortho-phenylene-di(β-oxyethylether), methyl-p-phenylene-di(β-oxyethylether) and the like. One of the novel cross-linking agents may be used alone or in admixture with each other or in admixture with any other suitable di- or polyvalent polyalcohol having aliphatic or aromatic ring systems, such as, for example, ethylene glycol, diethylene glycol, 1,4-butanediol, 1,3-propylene diol, trimethylol propane, a di-primary aromatic diamine of the type disclosed in U.S. Patent 2,778,810, hexahydropyrocatechol or the like. From about 0.4 to about 4 mols of the phenylene-di(β-oxyethylether) and, preferably, from about 1.5 to about 2.5 mols phenylene-di(β-oxyethylether) per mol organic compound having at least two reactive hydrogen atoms and a molecular weight of at least 1,000 should be used.

Any suitable organic compound having at least two reactive hydrogen atoms and a molecular weight of at least 1,000 and, preferably, such a compound having terminal hydroxyl groups may be utilized. A polyester or polyester amide prepared by condensation of a dicarboxylic acid, such as, for example, succinic acid, adipic acid, sebacic acid, or phthalic acid, with a glycol, such as, for example, ethylene glycol, diethylene glycol, 1,2-propylene glycol, 1,3-butylene glycol, 1,4-butylene glycol, with or without the addition of amino alcohols, amino carboxylic acids or diamines may be used. Preferably an excess of glycol is used in order that the polyester will have terminal OH groups. Furthermore, a polyether or polythioether, such as, for example, a polyalkylene ether glycol prepared by condensation of propylene oxide or ethylene oxide or a polyalkylene ether glycol, prepared by polymerizing tetrahydrofuran, a polyacetal of formaldehyde, or the like are further examples of suitable organic compounds having at least two reactive hydrogen atoms and a molecular weight of at least 1,000. The polythioethers may have SH groups instead of or in combination with OH groups. As stated hereinbefore, the hydroxyl number of the hydroxyl containing organic compound having at least two reactive hydrogen atoms should be within the range of from about 20 to about 80 or, in other words, such compounds having a molecular weight of at least 1,000 should contain from about 0.6 to about 2.4% functional groups, e.g., hydroxyl groups.

As pointed out hereinbefore, the organic polyisocyanates heretofore considered unsuitable for making elastomeric polyurethane plastics of optimum physical characteristics may be utilized in accordance with this invention. Examples of such organic polyisocyanates include 4,4'-diphenylmethane diisocyanate, alkyl-substituted 4,4'-diphenylmethane diisocyanates, such as, for example, diphenyldimethylmethane-4,4'-diisocyanates and the like, 2,6-toluylene diisocyanate, mixtures of 2,6-toluylene diisocyanate and 2,4-toluylene diisocyanate, m-phenylene diisocyanate, and uretdione containing diisocyanates. Moreover, those more reactive organic diisocyanates suitable for use with the heretofore available cross-linking agents may, of course, be used, such as, for example, 1,5-naphthylene diisocyanate, p-phenylene diisocyanate or any other suitable organic polyisocyanate.

Homogeneous or non-porous polyurethane plastics having the most desirable physical characteristics are obtained when diisocyanates and predominantly linear organic compounds having reactive hydrogen atoms and a molecular weight of at least 1,000 are used, so diisocyanates and difunctional polyesters, polyalkylene ethers and the like are preferred.

In practicing the invention, the organic compound having at least two reactive hydrogen atoms and a molecular weight of at least 1,000 may be reacted with an excess of organic diisocyanate over that required to react with each of the reactive hydrogen atoms in the terminal groups to form a prepolymer or adduct having terminal NCO groups and a higher molecular weight. This reaction should be conducted under substantially anhydrous conditions and the resulting prepolymer may then be reacted with the phenylene-di(β-oxyethylether) to form the cross-linked polyurethane plastic. This procedure gives best results, producing a product of optimum physical characteristics. However, it is possible to mix the phenylene-di(β-oxyethylether) with the organic compound having at least two reactive hydrogen atoms and a molecular weight of at least 1,000 and to mix this mixture with the organic polyisocyanates. Each of these procedures is suitable for use in preparing polyurethane plastics by a casting process wherein the mixture of prepolymer and cross-linking agent is poured as a liquid into a mold and heated until a hardened or solidified product is obtained. Solidification can be retarded by the addition of small amounts of acids or acid chlorides or tertiary bases.

In accordance with another embodiment of the invention particularly well suited for making polyurethane plastics by a two-step process in which the second step may be separated for a considerable length of time from the first step, the organic compound having at least two reactive hydrogen atoms and a molecular weight of at least 1,000 is mixed with less than the theoretical amount of organic polyisocyanate required to react with all of the reactive hydrogen atoms thereof and chemical reaction is brought about. This product is then stored until it is desired to form the finished polyurethane plastic at which time the phenylene-di(β-oxyethylether) and additional organic polyisocyanate are added and chemical reaction is brought about to complete the formation of plastic. This procedure may be modified to the extent that the organic compound having at least two reactive hydrogen atoms is reacted with an excess of organic polyisocyanate over that required to react with all of the terminal reactive hydrogen atoms and an excess of phenylene-di(β-oxyethylether) over the amount required to react with all of the isocyanate groups present may be added. When preparing a polyurethane plastic in a two step process the first step is built up by using less than the theoretical amount of organic polyisocyanate preferably 90–99% calculated on the end groups of the available reactive hydrogen atoms. When it is desired to produce the final product, additional polyisocyanate may be added and chemical reaction brought about.

The ratios of organic polyisocyanate to organic compound having at least two reactive hydrogen atoms and of phenylene-di(β-oxyethylether) to prepolymer should be carefully controlled depending upon the particular physical characteristics desired in the finished product. Thus, for example, when 4,4'-diphenylmethane diisocyanate and p-phenylene-di(β-oxyethylether) are used together, an excess of from about 200% to about 400% organic diisocyanate over that required to react with the reactive hydrogen atoms of the organic compound will produce a polyurethane plastic which is relatively hard and elastic. In fact, the plastic produced by this process having a given hardness is more elastic than the plastics heretofore available. If less than 200% excess diisocyanate is used, a softer and more rubber-like plastic having improved tensile strength, tear resistance, elongation and elasticity is obtained. The following table demonstrates the change in hardness and elasticity when a given polyester (of Example 1) is processed with increasing amounts of 4,4'-diphenyl methanediisocyanate and p-phenylene-di(β-oxyethylether).

| Isocyanate, percent | Ether, percent | Hardness, degrees Shore | Elasticity, percent |
|---|---|---|---|
| 30 | 12.4 | 85 | 47 |
| 35 | 16.8 | 90 | 40 |
| 40 | 20.0 | 93 | 39 |

The novel elastomeric homogeneous or non-porous polyurethane plastics provided by this invention may be used for making various rubber-like articles of manufacture, such as, for example, bushings, gears, door latches for vehicles, automobile tires and the like.

*Example 1*

Into 200 g. of a glycol adipic acid polyester dehydrated at 130° C., with an OH number of 53, 70 g. 4,4'-diphenylmethane diisocyanate are stirred in at the same temperature. The temperature is maintained at 130–140° C. for 15 minutes and then allowed to cool to 100° C. After brief application of vacuum, 33.6 g. molten p-phenylene di(β-hydroxyethyl ether) are stirred in at this temperature and the homogeneous melt is poured into molds. In about 1½ minutes the clear melt suddenly becomes cloudy and after about 5 more minutes solidification occurs. After 24 hours postcure at 100° C. an elastic material with the following properties is obtained:

Strength _____ 210 kg./cm.².
Elongation _____ 510%.
Permanent set _____ 28%.
Load at 300% elongation _____ 126 kg./cm.².
Hardness _____ 91° Shore.
Elasticity _____ 43%.

Under the same reaction conditions, on using the following proportions: 200 g. glycol adipic acid polyester (OH number 53) 80 g. 4,4'-diphenylmethane diisocyanate, and 40 g. p-phenylene-di(β-hydroxyethyl ether), products with the following properties are obtained:

Strength _____ 260 kg./cm.².
Elongation _____ 430%.
Permanent set _____ 240%.
Load at 300% elongation _____ 141 kg./cm.².
Hardness _____ 93° Shore.
Elasticity _____ 39%.

With the following starting materials: 200 g. glycol adipic acid polyester (OH number 53), 70 g. 4,4'-diphenylmethane diisocyanate, and 33.6 g. m-phenylene-di(β-hydroxyethyl ether), under the previously specified reaction conditions, materials with the following properties result:

Strength _____ 193 kg./cm.².
Elongation _____ 490%.
Permanent set _____ 16%.
Load at 300% elongation _____ 115 kg./cm.².
Hardness _____ 85° Shore.
Elasticity _____ 35%.

From the following starting materials: 200 g. tetrahydrofuran polymerizate (OH number 37), 70 g. 4,4'-diphenylmethane diisocyanate, and 33.6 g. p-phenylene-di(β-hydroxyethyl ether), under the conditions specified above, a product with the following properties is given:

Strength _____ 195 kg./cm.².
Elongation _____ 495%.
Permanent set _____ 46%.
Load at 300% elongation _____ 137 kg./cm.².
Hardness _____ 94° Shore.
Elasticity _____ 49%.

When 200 g. glycol adipic acid polyester (OH number 53), 60 g. m-phenylene diisocyanate, and 49.6 g. p-phenylene-di(β-hydroxyethyl ether), are processed in the initially described way, an elastomeric material with the following properties is obtained:

Strength _____ 291 kg./cm.².
Elongation _____ 450%.
Permanent set _____ 8%.
Load at 300% elongation _____ 175 kg./cm.².
Hardness _____ 87° Shore.
Elasticity _____ 55%.

*Example 2*

Into 1,000 g. of a glycol adipic acid ester with an OH number 53, dehydrated at 130° C., are stirred 47.5 g. p-phenylene-di-(β-hydroxyethyl ether). After a homogeneous melt has formed, 175 g. 4,4'-diaminodiphenylmethane diisocyanate are added gradually at 90–100° C. Thereupon, it is stirred until a high viscosity melt results which, poured into sheets, is postcured 12 hours at 100° C. The material obtained can be drawn out to a sheet on the roller and after rolling in 8% toluylene diisocyanate dimer can be pressed into molded bodies which have the following mechanical properties:

Strength _____ 314 kg./cm.².
Elongation _____ 682%.
Permanent set _____ 11%.
Load at 300% elongation _____ 38 kg./cm.².
Hardness _____ 75° Shore.
Elasticity _____ 44%.
Tear _____ 40 kg.

*Example 3*

Into 200 g. of a tetrahydrofuran polymerizate with an OH number of 50, 80 g. of 4,4'-diphenylmethane diisocyanate are stirred after dehydration at 130° C./12 mm. The temperature increases to 138° C. It is heated 20 minutes more at 130° C. and then 40 g. of previously melted p-phenylene-β-dihydroxyethyl ether are added to the melt. It is poured into prepared molds and kept at 100° C. for 24 hours more. An elastomeric material with the following mechanical properties results:

Strength _____ 195 kg./cm.².
Elongation _____ 495%.
Permanent set _____ 56%.
Elasticity _____ 49%.
Hardness _____ 94° Shore.
Load at 300% elongation _____ 137 kg./cm.².

*Example 4*

Into 300 g. of a polythioether produced by self-condensation of thiodiglycol, with an OH number of 45, are stirred 95 g. 4,4'-diphenylmethane diisocyanate after dehydration at 130° C. The reaction mixture is kept at this temperature for 10 minutes and then 37.2 g. of previously melted p-phenylene-β-dihydroxyethyl ether are added. After good stirring it is poured into prepared forms, heated for 24 hours at 100° C. and an elastomeric material with the following properties is obtained:

Strength _____ 146 kg./cm.².
Elongation _____ 250%.
Permanent set _____ 26%.
Elasticity _____ 44%.
Hardness _____ 87° Shore.

*Example 5*

If, instead of the polythioether named in Example 4, a polyacetal with an OH number of 45 obtained from butane-1,4-β-dihydroxyethyl glycol ether and formaldehyde is used, then at the same proportions and reaction conditions given in Example 4, elastomeric materials with similar properties as in Example 4 are obtained.

p-Phenylene-di(β-oxyethylether) may also be referred to as bis-(hydroxyethyl ether) of hydroquinone and has the formula

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A method for making an elastomeric substantially non-porous polyurethane which comprises reacting a member selected from the group consisting of a polyester prepared by esterification of a dicarboxylic acid and a saturated glycol, a poly(alkylene ether) glycol, a polythioether glycol having O and S ether links in the chain thereof, and a polyacetal prepared from a glycol and formaldehyde, said group member having an hydroxyl number of from about 20 to about 80, a molecular weight of at least about 1000 and an acid number not substantially greater than about 1.5, p-phenylene di(β-hydroxy ethylether) in the ratio of from about 0.4 mol to about 4 mols per mol of said group member, and a member selected from the group consisting of 4,4'-diphenyl dimethyl methane diisocyanate and 4,4'-diphenyl methane diisocyanate in an amount in excess of at least about 2 mols thereof per mol of said first mentioned group member.

2. The product of the process of claim 1.

3. The process of claim 1 wherein the diisocyanate is 4,4'-diphenyl methane diisocyanate.

References Cited in the file of this patent
UNITED STATES PATENTS

| | | |
|---|---|---|
| 2,729,618 | Müller | Jan. 3, 1956 |
| 2,861,972 | Müller | Nov. 25, 1958 |

FOREIGN PATENTS

| | | |
|---|---|---|
| 519,014 | Belgium | Oct. 5, 1953 |
| 167,675 | Australia | May 14, 1956 |
| 1,128,561 | France | Aug. 27, 1956 |
| 755,779 | Great Britain | Aug. 29, 1956 |

OTHER REFERENCES

Bayer: Angewandte Chemie, 59, 257–272 (1947).